(12) United States Patent
Park et al.

(10) Patent No.: US 9,515,540 B2
(45) Date of Patent: Dec. 6, 2016

(54) LINEAR VIBRATOR

(71) Applicant: SAMSUNG ELECTRO-MECHANICS CO., LTD., Suwon-si (KR)

(72) Inventors: Seok June Park, Suwon-si (KR); Jin Hoon Kim, Suwon-si (KR); Yong Jin Kim, Suwon-si (KR)

(73) Assignee: MPLUS CO., LTD., Suwon-Si, Gyeonggi-Do (KR)

( * ) Notice: Subject to any disclaimer, the term of this patent is extended or adjusted under 35 U.S.C. 154(b) by 340 days.

(21) Appl. No.: 14/176,887

(22) Filed: Feb. 10, 2014

(65) Prior Publication Data

US 2015/0123499 A1 May 7, 2015

(30) Foreign Application Priority Data

Nov. 5, 2013 (KR) ........................ 10-2013-0133718

(51) Int. Cl.
*H02K 33/16* (2006.01)
(52) U.S. Cl.
CPC ..................... *H02K 33/16* (2013.01)
(58) Field of Classification Search
CPC ........ H02K 33/16; H02K 33/02; H02K 1/34; H02K 33/18; H02K 7/063; H02K 33/00; B06B 1/045
USPC .................... 310/25, 28, 12.16, 81
See application file for complete search history.

(56) References Cited

U.S. PATENT DOCUMENTS

| 2009/0121559 A1* | 5/2009 | Lee | H02K 33/02 310/28 |
|---|---|---|---|
| 2011/0133578 A1* | 6/2011 | Choi | H02K 33/18 310/25 |

(Continued)

FOREIGN PATENT DOCUMENTS

| CN | 101436812 A | 5/2009 |
|---|---|---|
| CN | 102832778 A | 12/2012 |
| CN | 103138524 A | 6/2013 |

(Continued)

OTHER PUBLICATIONS

Office Action dated Oct. 27, 2014 for Korean Patent Application No. 10- 2013-0133718 and its English summary provided by Applicant's foreign counsel.

(Continued)

*Primary Examiner* — Terrance Kenerly
*Assistant Examiner* — Noli Manaloto
(74) *Attorney, Agent, or Firm* — LRK Patent Law Firm (57) ABSTRACT

A linear vibrator includes a housing providing an internal space; a fixed part including a coil fixed to the housing to be disposed in the internal space; a vibrating part including a magnet disposed to face the coil and generating electromagnetic force by interacting with the coil; and an elastic member having one end fixed to the housing and the other end fixed to the vibrating part to elastically support the vibrating part, wherein the elastic member includes a first fixed part fixed to the housing, a second fixed part fixed to the vibrating part, and a deformable part connecting the first fixed part and the second fixed part to each other and elastically deformed, and the first fixed part includes a welded part being welded and coupled to the housing at the outside of a portion of the first fixed part to which the deformable part is connected.

7 Claims, 6 Drawing Sheets

(56) References Cited

U.S. PATENT DOCUMENTS

2013/0134804 A1* 5/2013 Kim ................ B06B 1/045
 310/25
2013/0342035 A1* 12/2013 Kim ................ B06B 1/045
 310/25

FOREIGN PATENT DOCUMENTS

| KR | 10-2009-0048677 A | 5/2009 | |
| KR | 101156867 B1 * | 6/2012 | ............ H02K 33/18 |
| KR | 10-2013-0031528 A | 3/2013 | |

OTHER PUBLICATIONS

SIPO Office Action for Chinese Patent Application No. 201410081648.6 which corresponds to the above referenced U.S. application.

* cited by examiner

LINEAR VIBRATOR

CROSS-REFERENCE TO RELATED APPLICATION

This application claims the benefit of Korean Patent Application No. 10-2013-0133718 filed on Nov. 5, 2013, with the Korean Intellectual Property Office, the disclosure of which is incorporated in its entirety herein by reference.

BACKGROUND

The present disclosure relates to a linear vibrator.

Recently, as the release of personal digital assistants (PDA) having large liquid crystal display (LCD) screens for user convenience has rapidly increased, a touch screen scheme has been increasingly adopted for use therewith, and a vibration motor for generating vibrations at the time of a touch has come into common use.

Such a vibration motor, a component converting electrical energy into mechanical vibrations using the principle of generating electromagnetic force, is mounted in the PDA to thereby be used for silently notifying a user of call reception by transferring vibrations thereto.

According to the related art, a scheme of obtaining mechanical vibrations by generating rotary force through rotation of a rotor part having an unbalanced mass has been used. In this scheme, the rotary force is converted into mechanical vibrations by a rectifying action through a contact point between a brush and a commutator.

However, in a brush type structure using a commutator, since the brush passes through a clearance between segments of the commutator at the time of rotation of the motor, mechanical friction and electrical sparks may be caused and foreign materials may be generated, such that a lifespan of the motor may be reduced.

In addition, since time may be taken to arrive at a target amount of vibrations due to rotational inertia at the time of application of voltage to the motor, there may be a problem in implementing an appropriate amount of vibrations in a touch screen.

A linear vibrator has been mainly come into use in order to overcome disadvantages in terms of lifespan and response characteristics of the motor and to allow a vibration function to be implemented in the touch screen.

The linear vibrator does not use the principle of rotation of the motor, but uses a principle in which electromagnetic force, obtained through a spring installed in the vibrator and a mass body suspended from a spring, is periodically generated according to a resonance frequency to cause resonance, thereby generating vibrations.

In accordance with market trends for miniaturization and slimness in portable electronic devices, such a linear vibrator should be able to be slimed and be efficiently produced, and performance and characteristics of the linear vibrator should not be affected, even under the influence of several factors.

Particularly, in the case of a linear vibrator disposed within an internal space of a housing, parts of the linear vibrator are generally classified as a vibrating part and a fixed part, wherein the fixed part is fixed to the housing and the vibrating part is vibrated through electromagnetic interaction with the fixed part. Here, the vibrating part is fixed to the housing via an elastic member to implement vibration function. In this case, the elastic member is coupled to the housing using a typical welding scheme, wherein due to stress concentrated on a location at which the elastic member is welded, there is a risk of damage.

Patent Document 1, the following related art document alleviates the concentration of stress by including a pierced part in an elastic member. However, since it is relatively difficult to manufacture an elastic member having the above-mentioned structure, the unit production cost may be increased.

RELATED ART DOCUMENT (Patent Document 1) Korean Patent Laid-Open Publication No. 10-2013-0031528

SUMMARY

An aspect of the present disclosure may provide a linear vibrator including an elastic member having an extended lifespan by disposing a welded part of the elastic member in a predetermined position to distribute stress which may be concentrated on the elastic member.

According to an aspect of the present disclosure, a linear vibrator may include: a housing providing an internal space; a fixed part including a coil having one end fixed to the housing to be disposed in the internal space; a vibrating part including a magnet disposed to face the coil and generating electromagnetic force by interacting with the coil; and an elastic member having one end fixed to the housing and the other end fixed to the vibrating part to elastically support vibration of the vibrating part, wherein the elastic member may include a first fixed part fixed to the housing, a second fixed part fixed to the vibrating part, and a deformable part disposed to connect the first fixed part and the second fixed part to each other and elastically deformed, and the first fixed part may include a welded part being welded and coupled to the housing at the outside of a portion of the first fixed part to which the deformable part is connected.

A portion to which both ends of the deformable part and the first fixed part are connected may be formed to have a circular arc shape.

The first fixed part may be formed to have a circular ring shape, and the welded part may be disposed at the outside of a portion between virtual extended lines connecting a center of the first fixed part having the circular ring shape and centers of circular arcs provided at the portion to which the ends of the deformable part and the first fixed part are connected.

The welded part may be provided with an expanded part having a width in a radial direction wider than other portions of the first fixed part.

At least three portions to which the deformable part and the first fixed part are connected may be provided.

The welded part may be provided in a spot welding scheme to correspond to the number of portions to which the deformable part and the first fixed part are connected.

At least three welded parts may be provided in an equidistant manner in a circumferential direction in the portions to which the deformable part and the first fixed part are connected.

The linear vibrator may further include a yoke fixed to the housing, and the yoke may have the coil wound therearound.

The second fixed part may be formed to have a circular ring shape.

According to another aspect of the present disclosure, a linear vibrator may include: a housing providing an internal space; a fixed part including a magnet having one end fixed to the housing to be disposed in the internal space; a vibrating part including a coil disposed to face the magnet and generating electromagnetic force by interacting with the magnet; and an elastic member having one end fixed to the housing and the other end fixed to the vibrating part to thereby elastically support the vibrating part, wherein the elastic member may include a first fixed part fixed to the housing, a second fixed part fixed to the vibrating part, and a deformable part disposed to connect the first fixed part and the second fixed part to each other and elastically deformed, and the first fixed part may include a welded part being welded and coupled to the housing at the outside of a portion of the first fixed part to which the deformable part is connected.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION

Hereinafter, embodiments of the present disclosure will be described in detail with reference to the accompanying drawings.

The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

Figure 1:
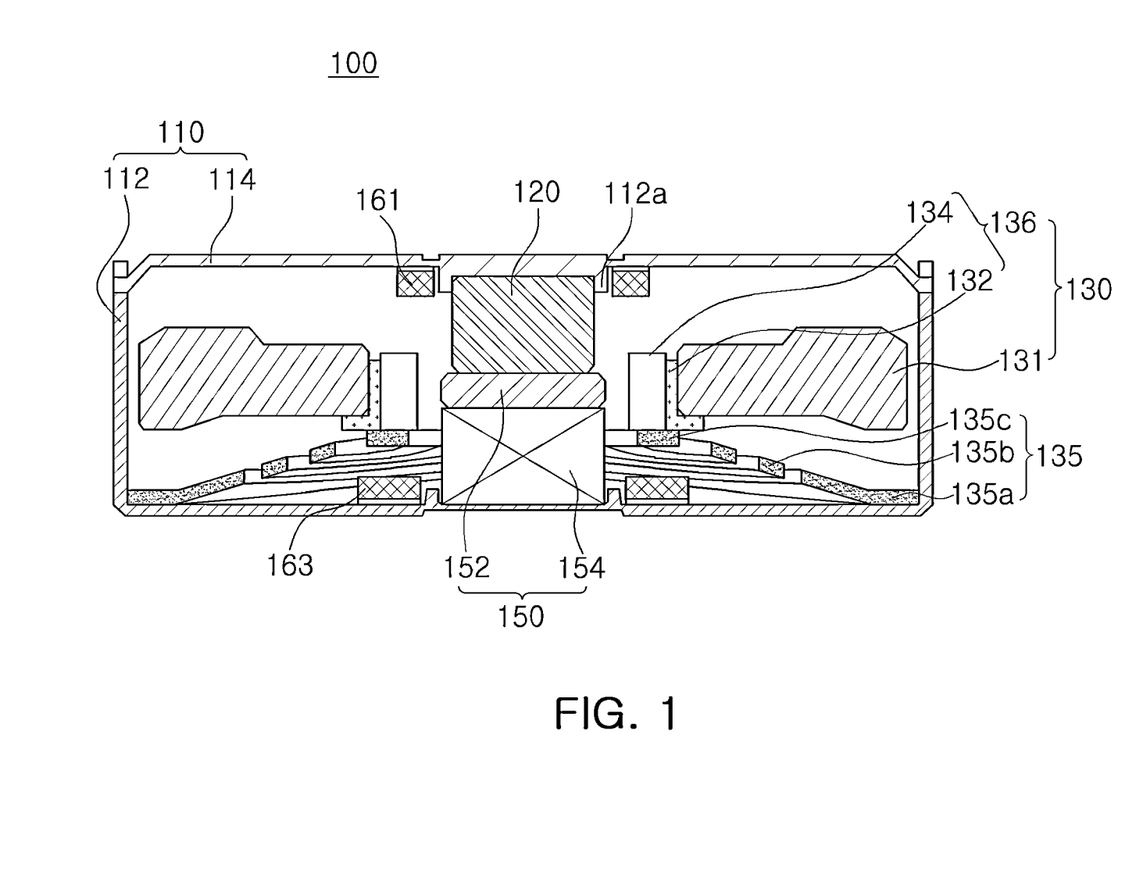
FIG. 1 is a schematic cross-sectional view illustrating a linear vibrator according to an exemplary embodiment of the present disclosure.
Figure 2:
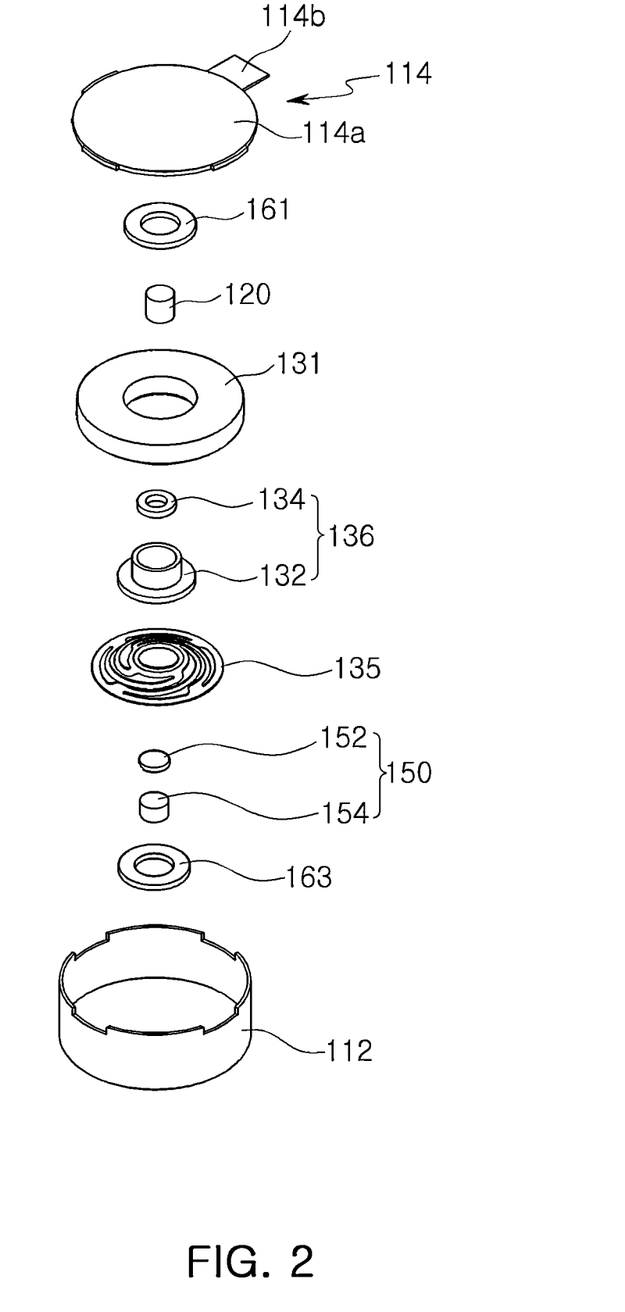
FIG. 2 is a schematic exploded perspective view illustrating the linear vibrator according to an exemplary embodiment of the present disclosure.

FIG. 1 is a schematic cross-sectional view illustrating a linear vibrator according to an exemplary embodiment of the present disclosure, and FIG. 2 is a schematic exploded perspective view illustrating the linear vibrator according to an exemplary embodiment of the present disclosure.

Terms with respect to directions will first be defined. An outer diameter or inner diameter direction refers to a direction from the center of a case 112 toward an outer peripheral surface of the case 112 or a direction opposite thereto. In addition, a circumferential direction refers to a direction along the circumference (including both clockwise and counterclockwise directions) of the case 112.

Referring to FIGS. 1 and 2, a linear vibrator 100 according to an exemplary embodiment of the present disclosure may include a housing 110 forming an outer casing of the linear vibrator 100, a vibrating part 130 including a mass body 131, an elastic member 135, and a magnetic field part 136, an electromagnet 150 including a yoke 152 and a coil 154, and a substrate (not shown) for supplying power to the electromagnet 150. In addition, according to the exemplary embodiment of the present disclosure, a separation preventing member 120 may be interposed between the electromagnet 150 and the housing 110. Further, dampers 161 and 163 may be provided between the vibrating part 130 and an inner surface of the housing 110 to absorb impacts when the vibrating part 130 and the inner surface of the housing 110 contact each other. In addition, the magnetic field part 136 may include a yoke 132 and a magnet 134.

The housing 110 may include a case 112 having one opened side and providing a predetermined internal space therein and a bracket 114 coupled to the opened side of the case 112 to close the internal space formed by the case 112.

Here, the internal space may accommodate the electromagnet 150 and the vibrating part 130, and the case 112 and the bracket 114 may also be formed integrally with each other.

In addition, the bracket 114 may include a closing part 114a closing the opened side of the case 112 and a protrusion part 114b protruded outwardly of the case 112 after the bracket 114 and the case 112 are coupled to each other.

Meanwhile, an upper surface inside the case 112 is provided with an outer wall 112a protruded to correspond to an outer diameter of the separation preventing member 120 to be described below. Therefore, an outer peripheral surface of the separation preventing member 120 is inserted into and fixed to an inner surface of the outer wall 112a, whereby the case 112 and the separation preventing member 120 may be more firmly coupled to each other.

The electromagnet 150 may be fixedly mounted in the housing 110 to be provided in the internal space of the housing 110. The electromagnet 150 may be coupled to the housing 110 (may be mounted on the case 112 or the bracket 114) by using at least one of a bonding method, a press-fitting method, and a welding method.

The magnet 150 may have an outer diameter smaller than inner diameters of the yoke 132 and the magnet 134 forming the magnetic field part 136 and be coupled to the housing 110 (the case 112 or the bracket 114) to serve as a fixed member.

Here, the electromagnet 150 may include the coil 154 fixed to the housing 110 and the yoke 152 fixed to the coil 154. The yoke 152 may be provided to allow a flow of magnetic flux to be smoothly formed during a process of generating electromagnetic force through interaction between the coil 154 and the magnet 134 of the vibrating part 130.

In addition, the yoke 152 may be disposed to face the magnet 134 of the vibrating part 130. Due to such a disposition of the yoke 152, the flow of magnetic flux may be smoothly formed during the process of generating electromagnetic force by the interaction between the coil 154 and the magnet 134.

Here, the yoke 152 may be formed of a magnetic material.

In addition, a lead wire of the coil may be connected to the substrate (not shown) provided on the inner surface of the housing 110. Of course, the substrate (not shown), which is a flexible printed circuit board, may be directly attached to a bottom of the coil 154. When a current having a predetermined frequency is applied to the coil 154, a magnetic field may be induced around the coil 154.

The vibrating part 130 may include the mass body 131 and the magnetic field part 136. Here, the magnetic field part 136 may include the yoke 132 and the magnet 134 provided between the mass body 131 and the yoke 132.

Meanwhile, one end of the vibrating part 130 may be fixed to the mass body 131 including the magnetic field part 136 therein and the other end thereof may be mounted on the housing 110 (mounted on the case 112 or the bracket 114) by the elastic member 135 fixed to the housing 110.

The magnetic field part 136 which is fixedly provided on an inner surface of the mass body 131 may be implemented to vibrate the vibrating part 130 relatively to the electromagnet 150 via the elastic member 135 by interacting with the electromagnet 150 which is fixedly provided in the housing 110 to face an inner side of the magnetic field part 136.

That is, the vibrating part 130 may be a member capable of being vertically vibrated via the elastic member 135.

Here, the yoke 132 and the magnet 134 may have an inner diameter larger than an outer diameter of the electromagnet 150.

Specifically, the magnetic field part 136 may be disposed to face the electromagnet 150, and at least a portion of the electromagnet 150 may be inserted into a space formed by the magnetic field part 136.

Therefore, during movement of the vibrating part 130, the electromagnet 150 and the magnetic field part 136 may be maintained in a state of non-contact.

In addition, the magnet 134 may be coupled to an inner peripheral surface of a hollow of the mass body 131.

When the mass body 131, a vibrating body vibrating vertically, is vertically vibrated, the mass body 122 may have an outer diameter smaller than an inner diameter of the case 112 so that it may be vibrated in the housing 110 without contact.

Therefore, a clearance having a predetermined size may be formed between an inner peripheral surface of the case 112 and an outer peripheral surface of the mass body 131.

This mass body 131 may be formed of a non-magnetic material or a paramagnetic material that is not affected by magnetic force generated from the magnet 134.

Therefore, the mass body 131 may be formed of a material such as tungsten having a specific gravity higher than that of iron, to thus increase mass of the vibrating part 130 in the same volume to adjust a resonance frequency, thereby significantly increasing an amount of vibrations.

However, the mass body 131 is not limited to being formed of tungsten, but may also be formed of various materials according to a designer's intentions.

Here, in order to correct a natural frequency of the linear vibrator 100, the mass body 131 may be provided with an accommodating space into which a sub mass body may be additionally inserted, such that mass of the mass body 131 may be increased or decreased.

When a current is applied to the coil 154 according to a predetermined frequency, a magnetic field may be induced around the coil 154. In this case, when electromagnetic force is excited through the coil 154, a magnetic flux passing through the coil 154 from the magnet 134 is formed in a horizontal direction and a magnetic field generated by the coil 154 is formed in a vertical direction, such that the vibrating part 130 may vibrate in the vertical direction.

Therefore, a magnetic flux direction of the magnet 134 and a vibration direction of the vibrating part 130 may be perpendicular to each other.

That is, when electromagnetic force having the same frequency as a mechanical natural frequency of the vibrating part 130 is formed, resonance vibrations are generated in the vibrating part 130, such that a maximum vibration amount may be obtained, wherein the natural frequency of the vibrating part 130 is affected by the mass of the vibrating part 130 and an elastic modulus of the elastic member 135.

Here, the current applied to the coil 154, that is, external power having a predetermined frequency, may be provided through the substrate (not shown) electrically connected to the coil 154.

The elastic member 135 is a member coupled to the mass body 131 and the housing 110 (the case 112 or the bracket 114) as described above to thereby provide elastic force thereto. An elastic modulus of the elastic member 135 has an effect on a natural frequency of the vibrating part 130.

Here, the elastic member 135 may be a plate spring including a first fixed part 135a fixed to the housing 110, a second fixed part 135c fixed to the vibrating part 130, and a deformable part 135b disposed to connect the first fixed part 135a and the second fixed part 135c to each other to thereby be elastically deformed. In addition, the first fixed part 135a may include a welded part 135w which is welded and coupled to the housing 110 at the outside of a portion to which the first fixed part 135a and the deformable part 135b are connected.

Figure 5:
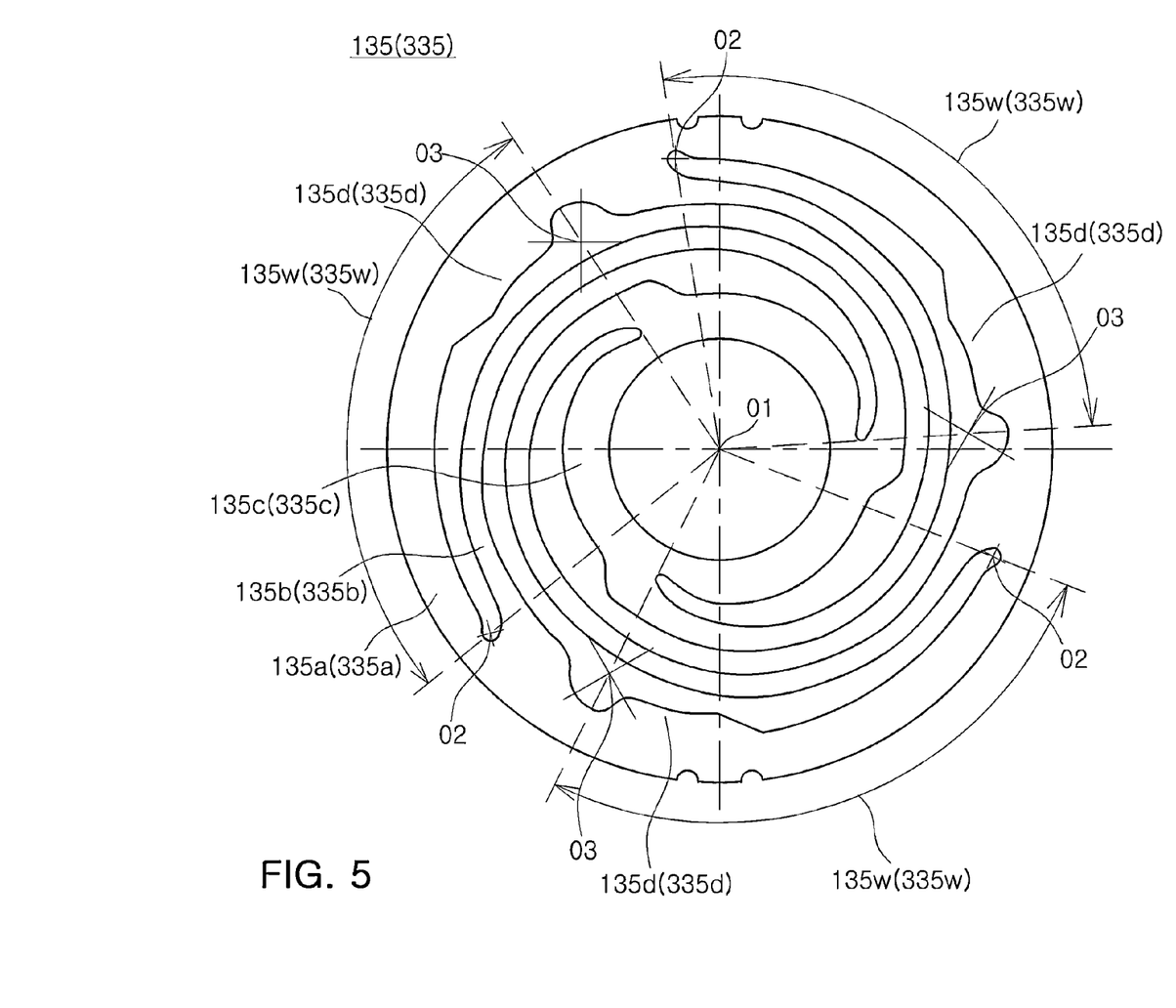
FIG. 5 illustrates a structure of an elastic member used in an exemplary embodiment of the present disclosure.

FIG. 5 illustrates a structure of an elastic member used in an exemplary embodiment of the present disclosure.

Basically, according to an exemplary embodiment of the present disclosure, the elastic member 135 may be coupled to the housing 110 (the case 112 or the bracket 114) by welding.

More specifically, the first fixed part 135a of the elastic member 135 may be welded and coupled to the housing 110.

However, a portion of the elastic member 135 being welded may suffer from the concentration of stress according to a position at which the first fixed part 135a is welded and coupled to the housing 110. Therefore, according to the exemplary embodiment of the present disclosure, the concentration of stress may be prevented by specifically limiting the position of the portion of the first fixed part 135a which is welded and coupled to the housing 110.

According to the exemplary embodiment of the present disclosure, the elastic member 135 may include the welded part 135w which is welded and coupled to the housing 110 at the outside of the portion of the first fixed part 135a to which the deformable part 135b is connected. That is, the first fixed part 135a may include the welded part 135w which is welded and coupled to the housing 110 at a portion of the first fixed part 135a other than the portion thereof to which the first fixed part 135a and the deformable part 135b are connected.

More specifically, a portion to which both ends of the deformable part 135b and the first fixed part 135a are connected may be formed to have a circular arc shape, and the first fixed part 135a may be formed to have a circular ring shape. In this case, the welded part 135w may be disposed at the outside of a portion between two virtual extended lines connecting the center O1 of the first fixed part 135a having the circular ring shape to the centers O2 and O3 of circular arcs provided at the portions to which both ends of the deformable part 135b and the first fixed part 135a are connected.

In addition, the welded part 135w may be provided with an expanded part 135d having a width in a radial direction wider than other portions of the first fixed part 135a, and the expanded part 135d may be welded to the housing 110.

In addition, there may be provided at least three portions to which the deformable part 135b and the first fixed part 135a are connected, and the welded part 135w may be provided in a spot welding scheme to correspond to the number of the portions to which the deformable part 135*b* and the first fixed part 135*a* are connected. Further, at least three welded parts 135*w* may be provided in an equidistant manner in a circumferential direction in the portions to which the deformable part 135*b* and the first fixed part 135*a* are connected.

Meanwhile, the second fixed part 135*c* may be formed to have a circular ring shape in the circumferential direction.

The separation preventing member 120 may be interposed between the other end of the electromagnet 150 and the housing 110. Specifically, in the case in which the other end of the electromagnet 150 is fixed to the bracket 114, the separation preventing member 120 may be interposed between the other end of the electromagnet 150 and the case 112.

In a case of the linear vibrator included in an internal space of the housing 110, parts of the linear vibrator are generally classified as a vibrating part and a fixed part, wherein the fixed part is fixed to the housing and the vibrating part is vibrated by electromagnetic interaction with the fixed part. Here, the fixed part fixed to the housing may be separated from the housing by external impact, or the like which is applied to the linear vibrator. Therefore, according to the exemplary embodiment of the present disclosure, the separation preventing member 120 capable of firmly fixing the electromagnet 150 corresponding to the fixed part may be additionally provided.

That is, since one end of the electromagnet 150 corresponds to a fixed end fixed to the housing 110 (shown as the case 112 in the drawings) and the other end thereof corresponds to a free end, the electromagnet 150 has an unstable structure. Therefore, by fitting a member capable of connecting the free end to the case 112 between the free end and the case 112 to change the free end to the fixed end, the electromagnet 150 may maintain a firmly fixed state even in a case in which the external impact is applied thereto.

Here, the separation preventing member 120 may be formed of a magnetic material or a non-magnetic material. In the case in which the separation preventing member 120 is formed of a magnetic material, the separation preventing member 120 may serve as the yoke to smooth a flow of magnetic flux. In addition, in the case in which the separation preventing member 120 is formed of a non-magnetic material, the separation preventing member 120 may prevent leakage of magnetic flux.

In addition, the separation preventing member 120 may be at least partially formed of an elastic body to serve as a buffering member. That is, the separation preventing member 120 may be fitted between the other end of the electromagnet 150 and the bracket 114. Therefore, in the case in which the separation preventing member 120 is formed of a material having some degree of elastic force, the separation preventing member 120 may be fitted between the other end of the electromagnet 150 and the case 112 and be then elastically restored, thereby more firmly fixing the electromagnet 150.

Here, the separation preventing part 120 may be at least partly formed of materials such as rubber, silicon, cork, propylene, poron, or the like, capable of absorbing an impact in the case in which the external impact is present, or may be configured of a spring, or the like, having elastic force.

Meanwhile, the housing 110 may be provided with the outer wall 112*a* protruded into the internal space and the separation preventing member 120 may be inserted into the inside of the outer wall 112*a*. The outer wall 112*a* may more firmly fix the separation preventing member 120. In addition, the outer wall 112*a* may serve to guide a position of the separation preventing member 120.

Figure 3:
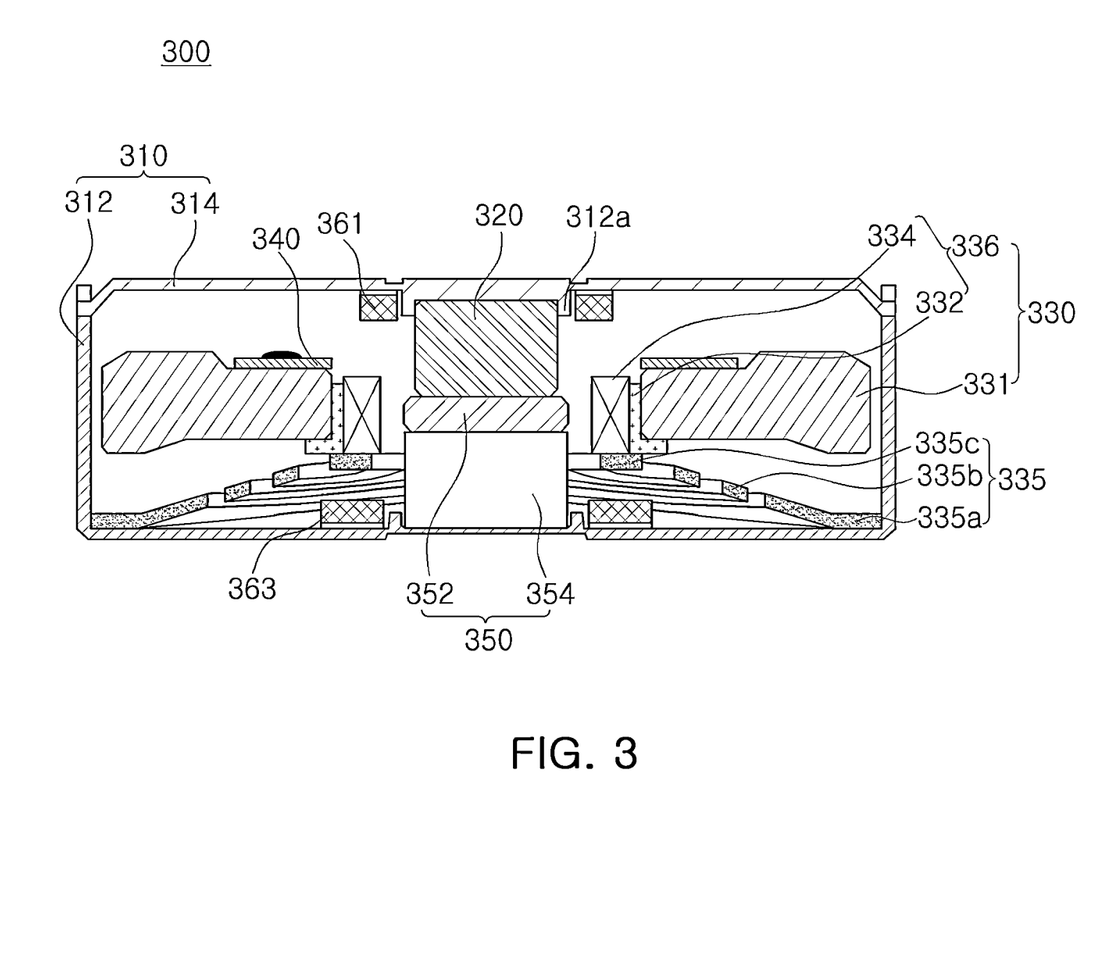
FIG. 3 is a schematic cross-sectional view illustrating a linear vibrator according to another exemplary embodiment of the present disclosure.
Figure 4:
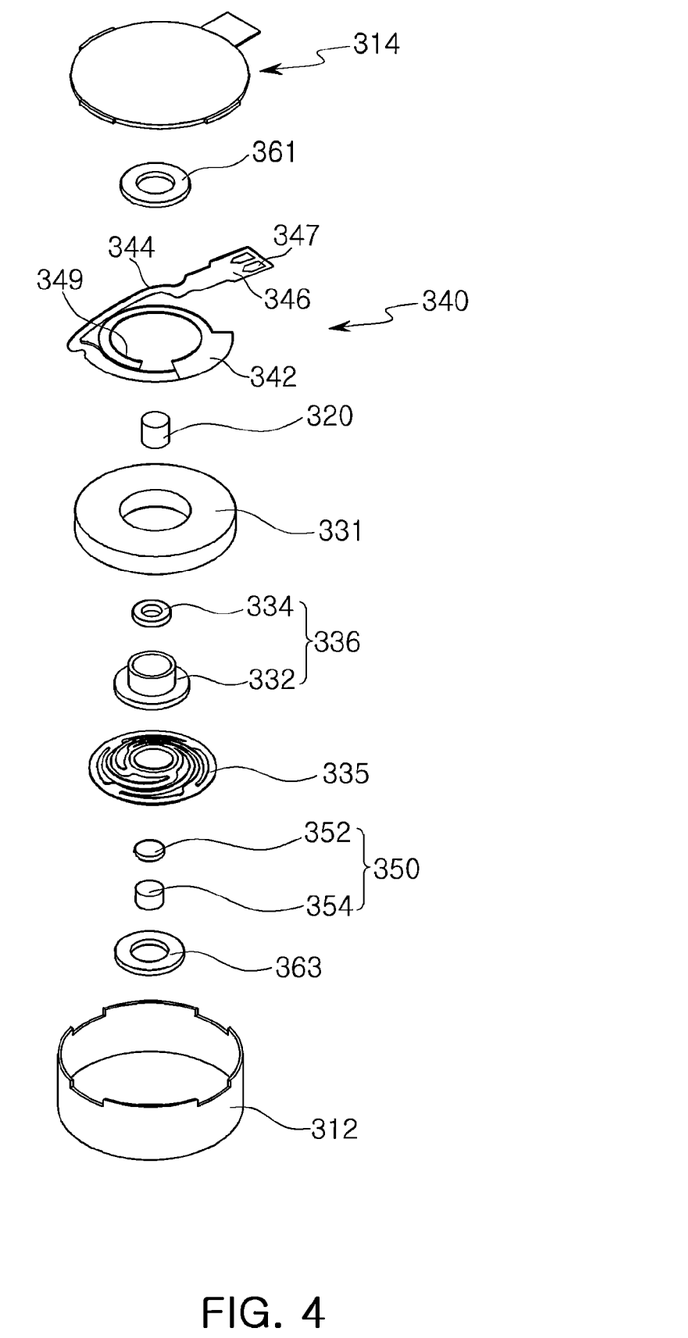
FIG. 4 is a schematic exploded perspective view illustrating the linear vibrator according to another exemplary embodiment of the present disclosure.

FIG. 3 is a schematic cross-sectional view illustrating a linear vibrator according to another exemplary embodiment of the present disclosure, and FIG. 4 is a schematic exploded perspective view illustrating the linear vibrator according to another exemplary embodiment of the present disclosure.

A linear vibrator 300 according to another exemplary embodiment of the present disclosure has an electromagnet and a magnetic field part disposed in different positions as compared to those of the linear vibrator 100 described with reference to FIGS. 1 and 2.

That is, the linear vibrator 100 of FIGS. 1 and 2 has a structure in which the magnetic field part 136 including the magnet 134 is provided in the vibrating part 130, and the electromagnet 150 is provided in the housing (the case 112 or the bracket 114) which is the fixed part. In contrast, the linear vibrator 300 of FIGS. 3 and 4 has a structure in which an electromagnet 336 is provided in a vibrating part 330, and a magnetic field part 350 including a magnet 354 is provided in a housing 310 (a case 312 or a bracket 314) which is a fixed part.

Referring to FIGS. 4 and 5, the linear vibrator 300 according to this exemplary embodiment of the present disclosure may include the housing 310 forming an outer casing of the linear vibrator 300, the vibrating part 330 including a mass body 331, an elastic member 335, and an electromagnet 336, a magnetic field part 350 including a yoke 352 and a magnet 354, and a substrate 340 for supplying power to the electromagnet 336. In addition, according to the exemplary embodiment of the present disclosure, a separation preventing member 320 may be interposed between the magnetic field part 350 and the housing 310. Here, the electromagnet 336 may include a yoke 332 and a coil 334. In addition, the magnetic field part 350 may include the yoke 352 and the magnet 354. In addition, dampers 361 and 363 may be provided between the vibrating part 330 and an inner surface of the housing 310 to absorb impacts in the case that the vibrating part 330 and the inner surface of the housing 310 contact each other.

The housing 310 may include the case 312 having one opened side and providing a predetermined internal space therein and the bracket 314 coupled to the opened side of the case 312 to close the internal space formed by the case 312.

Here, the internal space may accommodate the magnetic field part 350, the vibrating part 330, and the like, and the case 312 and the bracket 314 may also be formed integrally with each other.

In addition, the bracket 314 may include a closing part 314*a* closing the opened side of the case 312 and a protrusion part 314*b* protruded outwardly of the case 312 after the bracket 314 and the case 312 are coupled to each other.

Meanwhile, an upper surface inside the case 312 is provided with an outer wall 312*a* protruded to correspond to an outer diameter of the separation preventing member 320 to be described below. Therefore, an outer peripheral surface of the separation preventing member 320 is inserted into and fixed to an inner surface of the outer wall 312*a*, whereby the case 312 and the separation preventing member 320 may be more firmly coupled to each other.

The magnetic field part 350 may be fixedly mounted in the housing 310 to be disposed in the internal space of the housing 310. The magnetic field part 350 may be coupled to the housing 310 (may be mounted on the case 312 or the bracket 314) by using at least one of a bonding method, a press-fitting method, and a welding method.

The magnetic field part 350 may have an outer diameter smaller than an inner diameter of the yoke 332 forming the electromagnet 336 and may be coupled to the housing 310 (the case 312 or the bracket 314) to serve as a fixed member.

Here, the magnetic field part 350 may be configured to include the magnet 354 fixed to the housing 310 and the yoke 352 fixed to the magnet 354. The yoke 352 may be provided to allow magnetic flux to flow smoothly during a process of generating electromagnetic force through interaction between the magnet 354 and the coil 334 of the vibrating part 330.

The yoke 352 may be disposed to face the coil 334 of the vibrating part 330. Due to such a disposition of the yoke 352, the flow of magnetic flux may be smoothly formed during the process of generating electromagnetic force by the interaction between the magnet 354 and the coil 334.

Here, the yoke 352 may be formed of a magnetic material.

The vibrating part 330 may include the mass body 331 and the electromagnet 336. Here, the electromagnet 336 may include the yoke 332 and the coil 334.

The electromagnet 336 which is fixedly provided on an inner surface of the mass body 331 may be implemented to vibrate the vibrating part 330 relatively to the magnetic field part 350 via the elastic member 335 by interacting with the magnetic field part 350 which is fixedly provided in the housing 310 to face an inner side of the electromagnet 336.

That is, the vibrating part 330 may be a member capable of being vertically vibrated via the elastic member 335.

Here, the yoke 332 and the coil 334 may have an inner diameter larger than an outer diameter of the magnetic field part 350.

Specifically, the electromagnet 336 may be disposed to face the magnetic field part 350, and at least a portion of the magnetic field part 350 may be inserted into a space formed by the electromagnet 336.

Therefore, during movement of the vibrating part 330, the magnetic field part 350 and the electromagnet 336 may be maintained in a state of non-contact.

In addition, the coil 334 may be coupled to an inner peripheral surface of a hollow of the mass body 331.

When the mass body 331, a vibrating body vibrating vertically, is vertically vibrated, the mass body 331 may have an outer diameter smaller than an inner diameter of the case 312 so that it may be vibrated in the housing 310 without contact.

Therefore, a clearance having a predetermined size may be formed between an inner peripheral surface of the case 312 and an outer peripheral surface of the mass body 331.

This mass body 331 may be formed of a non-magnetic material or a paramagnetic material that is not affected by magnetic force generated from the magnet 354.

Therefore, the mass body 331 may be formed of a material such as tungsten having a specific gravity higher than that of iron, to thus increase mass of the vibrating part 330 in the same volume to adjust a resonance frequency, thereby significantly increasing an amount of vibrations.

However, the mass body 331 is not limited to being formed of tungsten, but may also be formed of various materials according to a designer's intentions.

Here, in order to correct a natural frequency of the linear vibrator 300, the mass body 331 may be provided with an accommodating space into which a sub mass body may be additionally inserted, such that mass of the mass body 331 may be increased or decreased.

When a current is applied to the coil 334 according to a predetermined frequency, a magnetic field may be induced around the coil 334. In this case, when electromagnetic force is excited by the coil 334, magnetic flux passing through the coil 334 from the magnet 354 is formed in a horizontal direction and a magnetic field generated by the coil 334 is formed in a vertical direction, such that the vibrating part 330 may vibrate in the vertical direction.

Therefore, a magnetic flux direction of the magnet 354 and a vibration direction of the vibrating part 330 may be perpendicular to each other.

That is, when electromagnetic force having the same frequency as a mechanical natural frequency of the vibrating part 330 is formed, resonance vibrations are generated in the vibrating part 330, such that a maximum vibration amount may be obtained, wherein the natural frequency of the vibrating part 330 is affected by the mass of the vibrating part 330 and an elastic modulus of the elastic member 335.

Here, the current applied to the coil 334, that is, external power having a predetermined frequency, may be provided through the substrate 340 electrically connected to the coil 334. A description thereof will be provided below.

The elastic member 335 is a member coupled to the mass body 331 and the housing 310 (the case 312 or the bracket 314) as described above to thereby provide elastic force thereto. An elastic modulus of the elastic member 335 has an effect on a natural frequency of the vibrating part 330.

Here, the elastic member 335 may be a plate spring including a first fixed part 335a fixed to the housing 310, a second fixed part 335c fixed to the vibrating part 330, and a deformable part 335b disposed to connect the first fixed part 335a and the second fixed part 335c to each other to thereby be elastically deformed. In addition, the first fixed part 335a may include a welded part 335w which is welded and coupled to the housing 310 at the outside of a portion to which the first fixed part 335a and the deformable part 335b are connected.

FIG. 5 illustrates a structure of an elastic member used in an exemplary embodiment of the present disclosure.

Basically, according to an exemplary embodiment of the present disclosure, the elastic member 335 may be coupled to the housing 310 (the case 312 or the bracket 314) by welding. More specifically, the first fixed part 335a of the elastic member 335 may be welded and coupled to the housing 310.

However, a portion of the elastic member 335 being welded may suffer from the concentration of stress according to a position at which the first fixed part 335a is welded and coupled to the housing 310. Therefore, according to the exemplary embodiment of the present disclosure, the concentration of stress may be prevented by specifically limiting the position of the portion of the first fixed part 335a which is welded and coupled to the housing 310.

According to the exemplary embodiment of the present disclosure, the first fixed part 335a of the elastic member 335 may include the welded part 335w which is welded and coupled to the housing 310 at the outside of the portion to which the first fixed part 335a and the deformable part 335b are connected. That is, the first fixed part 335a may include the welded part 335w which is welded and coupled to the housing 310 at a portion of the first fixed part 335a other than the portion thereof to which the first fixed part 335a and the deformable part 335b are connected.

More specifically, a portion to which both ends of the deformable part 335b and the first fixed part 335a are connected may be formed to have a circular arc shape, and the first fixed part 335a may be formed to have a circular ring shape. In this case, the welded part 335w may be disposed at the outside of a portion between two virtual extended lines connecting the center O1 of the first fixed part 335a having the circular ring shape and the centers O2 and O3 of circular arcs provided at the portions to which both ends of the deformable part 335b and the first fixed part 335a are connected.

In addition, the welded part 335w may be provided with an expanded part 335d having a width in a radial direction wider than other portions of the first fixed part 335a, and the expanded part 335d may be welded to the housing 310.

In addition, there may be provided at least three portions to which the deformable part 335b and the first fixed part 335a are connected, and the welded part 335w may be provided in a spot welding scheme to correspond to the number of the portions to which the deformable part 335b and the first fixed part 335a are connected. Further, at least three welded parts 335w may be provided in an equidistant manner in a circumferential direction in the portions to which the deformable part 335b and the first fixed part 335a are connected.

Meanwhile, the second fixed part 335c may be formed to have a circular ring shape in the circumferential direction.

The substrate 340 may be coupled to one surface of the mass body 331 configuring the vibrating part 330 and include a hole 349 passing through the vibrating part 330 not to contact the magnetic field part 350 at the time of vibrations of the vibrating part 330.

That is, the hole 349 may prevent a contact between the magnetic field part 350 and the substrate 340 and allow an amplitude to be unlimited at the time of the vibration and the movement of the vibrating part 330 to secure a great amount of vibrations in the vibrating part 330 as much as possible.

Therefore, the linear vibrator 300 according to this exemplary embodiment of the present disclosure may obtain more stable linear vibration through the hole 349.

Specifically, one end of the substrate 340 may be coupled to the vibrating part 330 to thereby become a free end, and the other end thereof may be coupled to the housing 310 to thereby become a fixed end.

Here, the substrate 340 will be described in detail. The substrate 340 may be a flexible printed circuit board and include a moving piece 342 coupled to the mass body 331 of the vibrating part 330, a fixed piece 346 coupled to the housing 310, and a connecting piece 344 connecting the moving piece 342 and the fixed piece 346 to each other.

In addition, an internal space formed by the moving piece 342 refers to the hole 349 described above.

The fixed piece 346 may include a power connection terminal 347 provided on an upper surface thereof in order to supply power to the coil 333 and the power connection terminal 347 may be protruded outwardly of the housing 310.

Therefore, the fixed piece 346 of the substrate 340 may be coupled to the protrusion part 314b.

In addition, the substrate 340 may include the connecting piece 344 connecting the moving piece 342 and the fixed piece 346 to each other, and the connecting piece 344 may be swung from an end portion of the fixed piece 346 in the circumference direction of the moving piece 342 in a state in which it is spaced apart from an edge of the moving piece 342 by a predetermined interval to allow the moving piece 342 to vibrate vertically.

In addition, the substrate 340 may include an electrode pad (not shown) provided on a lower surface thereof in order to transfer an electrical signal having a specific frequency to the coil 334, and the electrode pad (not shown) may be electrically connected to a lead wire of the coil 334.

Here, the electrode pad (not shown) may be formed at the outside of an outer diameter of the coil 334 and may be electrically connected to one end of the lead wire of the coil 334 by soldering.

In other words, the electrode pad (not shown) may be disposed on a lower surface of the moving piece 342 of the substrate 340 and be coupled to the lead wire of the coil 334.

Therefore, the lead wire of the coil 334 may be coupled to the electrode pad (not shown) of the substrate 340 at the outside of the coil 334, such that it does not affect the vibration and the movement of the linear vibrator 300 according to the exemplary embodiment of the present disclosure when the linear vibrator 300 operates.

The separation preventing member 320 may be interposed between the other end of the magnetic field part 350 and the housing 310. Specifically, in the case in which the other end of the magnetic field part 350 is fixed to the case 312, the separation preventing member 320 may be interposed between the other end of the magnetic field part 350 and the bracket 314.

In a case of the linear vibrator included in an internal space of the housing 310, parts of the linear vibrator are generally classified as a vibrating part and a fixed part, wherein the fixed part is fixed to the housing and the vibrating part is vibrated by electromagnetic interaction with the fixed part. Here, the fixed part fixed to the housing may be separated from the housing by external impact, or the like which is applied to the linear vibrator. Therefore, according to the exemplary embodiment of the present disclosure, the separation preventing member 320 capable of firmly fixing the magnetic field part 350 corresponding to the fixed part may be additionally provided.

That is, since one end of the magnetic field part 350 corresponds to a fixed end fixed to the case 312 and the other end thereof corresponds to a free end, the magnetic field part 350 has an unstable structure. Therefore, by fitting a member capable of connecting the free end to the bracket 314 between the free end and the bracket 314 to change the free end to the fixed end, the magnetic field part 350 may maintain a firmly fixed state even in a case in which the external impact is applied thereto.

Here, the separation preventing member 320 may be formed of a magnetic material or a non-magnetic material. In the case in which the separation preventing member 320 is formed of a magnetic material, the separation preventing member 320 may serve as the yoke to smooth a flow of magnetic flux. In addition, in the case in which the separation preventing member 320 is formed of a non-magnetic material, the separation preventing member 320 may prevent leakage of magnetic flux.

In addition, the separation preventing member 320 may be at least partially formed of an elastic body to serve as a buffering member. That is, the separation preventing member 320 may be a member fitted between the other end of the magnetic field part 350 and the bracket 314. Therefore, in the case in which the separation preventing member 320 is formed of a material having some degree of elastic force, the separation preventing member 320 may fitted between the other end of the magnetic field part 350 and the bracket 314 and be then elastically restored, thereby more firmly fixing the magnetic field part 350.

Here, the separation preventing member 320 may be at least partly formed of a material having the elastic force such as rubber, silicon, a spring, or the like.

Meanwhile, the housing 310 may be provided with the outer wall 312a protruded into the internal space and the separation preventing member 320 may be inserted into the inside of the outer wall 312a. The outer wall 312a may more firmly fix the separation preventing member 320. In addition, the outer wall 312a may serve to guide a position of the separation preventing member 320.

Figure 6:
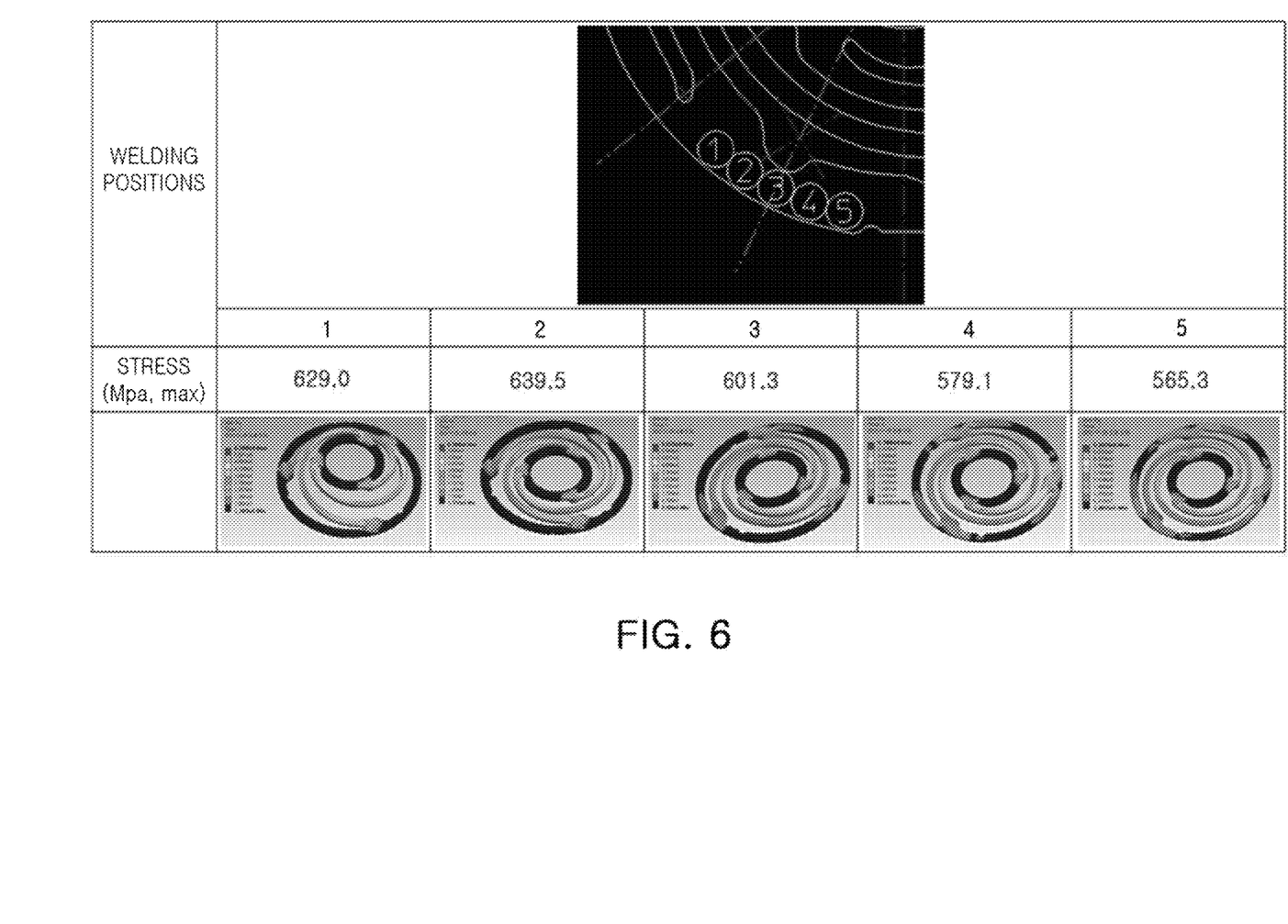
FIG. 6 illustrates a simulation result proving that stress concentration is alleviated according to a welding position of an elastic member used in an exemplary embodiment of the present disclosure.

FIG. 6 illustrates a simulation result proving that stress concentration is alleviated according to a welding position of an elastic member used in an exemplary embodiment of the present disclosure.

Referring to FIG. 6, FIG. 6 illustrates a comparison between maximal stresses generated from the elastic member 135 according to positions at which the elastic member 135 is welded and coupled to the housing 110 (but, the maximal stress value is a relative value).

As shown in FIG. 6, in the case in which the welding process is performed at points 1 to 5 of the elastic member 135, respectively, the maximal stress generated from point 1 of the elastic member 135 is 629, the maximal stress generated from point 2 thereof is 639.5, the maximal stress generated from point 3 thereof is 601.3, the maximal stress generated from point 4 is 579.1, and the maximal stress generated from point 5 thereof is 565.3.

Here, the first fixed part 135a of the elastic member 135 is welded and coupled to the housing 110 at points 1 and 2, i.e., at a portion of the first fixed part 135a connected to the deformable part 135b; at point 3, i.e., at a boundary point of the portion of the first fixed part 135a connected to the deformable part 135b; and at points 4 and 5, i.e., at the outside of the portion of the first fixed part 135a connected to the deformable part 135b.

As described above, it may be appreciated that at points 1 and 2, the stress is concentrated on the portion of the elastic member 135 in which the first fixed part 135a is connected to the deformable part 135b, and the concentration of stress on the portion of the elastic member 135 in which the first fixed part 135a is connected to the deformable part 135b is alleviated from point 3 to point 5.

As set forth above, according to exemplary embodiments of the present disclosure, the lifespan of the elastic member may be extended by specifying the welded part of the elastic member in a predetermined position to distribute stress which may be concentrated on the elastic member.

While exemplary embodiments have been shown and described above, it will be apparent to those skilled in the art that modifications and variations could be made without departing from the spirit and scope of the present disclosure as defined by the appended claims.

What is claimed is:

1. A linear vibrator, comprising:
a housing providing an internal space;
a fixed part including a coil having one end fixed to the housing to be disposed in the internal space;
a vibrating part including a magnet disposed to face the coil and generating electromagnetic force by interacting with the coil;
an elastic member having one end fixed to the housing and the other end fixed to the vibrating part to elastically support vibration of the vibrating part; and
a yoke fixed to the coil which is wound around the yoke,
wherein the elastic member includes a first fixed part fixed to the housing, a second fixed part fixed to the vibrating part, and a deformable part disposed to connect the first fixed part and the second fixed part to each other and elastically deformed,
wherein the first fixed part is formed to have a circular ring shape and includes a welded part being welded and coupled to the housing at the outside of a portion of the first fixed part to which the deformable part is connected,
wherein a portion to which both ends of the deformable part and the first fixed part are connected is formed to have a circular arc shape, and
wherein the welded part is disposed at the outside of a portion between virtual extended lines which connect a center of the circular ring shape of the first fixed part and centers of circular arcs of the portion to which the both ends of the deformable part and the first fixed part are connected.

2. The linear vibrator of claim 1, wherein the welded part is provided with an expanded part having a width in a radial direction wider than other portions of the first fixed part.

3. The linear vibrator of claim 1, wherein at least three portions to which the deformable part and the first fixed part are connected are provided.

4. The linear vibrator of claim 3, wherein the welded part is provided in a spot welding scheme to correspond to the number of portions to which the deformable part and the first fixed part are connected.

5. The linear vibrator of claim 4, wherein at least three welded parts are provided in an equidistant manner in a circumferential direction in the portions to which the deformable part and the first fixed part are connected.

6. The linear vibrator of claim 1, wherein the second fixed part is formed to have a circular ring shape.

7. A linear vibrator, comprising:
a housing providing an internal space;
a fixed part including a magnet having one end fixed to the housing to be disposed in the internal space;
a vibrating part including an electromagnet; and
an elastic member having one end fixed to the housing and the other end fixed to the vibrating part to thereby elastically support vibration of the vibrating part,
wherein the electromagnet includes a yoke and a coil disposed to face the magnet and generating electromagnetic force by interacting with the magnet,
wherein the elastic member includes a first fixed part fixed to the housing, a second fixed part fixed to the vibrating part, and a deformable part disposed to connect the first fixed part and the second fixed part to each other and elastically deformed,
wherein the first fixed part is formed to have a circular ring shape and includes a welded part being welded and coupled to the housing at the outside of a portion of the first fixed part to which the deformable part is connected,
wherein a portion to which both ends of the deformable part and the first fixed part are connected is formed to have a circular arc shape, and
wherein the welded part is disposed at the outside of a portion between virtual extended lines which connect a center of the circular ring shape of the first fixed part and centers of circular arcs of the portion to which the both ends of the deformable part and the first fixed part are connected.

* * * * *